United States Patent
Luo et al.

(10) Patent No.: US 10,831,920 B2
(45) Date of Patent: Nov. 10, 2020

(54) FILTER-BASED CONTROL INFORMATION QUERY IN SOFTWARE-DEFINED NETWORKING (SDN) ENVIRONMENTS

(71) Applicant: Nicira, Inc., Palo Alto, CA (US)

(72) Inventors: Ye Luo, Beijing (CN); Feng Pan, Beijing (CN); Donghai Han, Beijing (CN); Caixia Jiang, Beijing (CN); Qi Wu, Beijing (CN)

(73) Assignee: NICIRA, INC., Palo Alto, CA (US)

( * ) Notice: Subject to any disclaimer, the term of this patent is extended or adjusted under 35 U.S.C. 154(b) by 305 days.

(21) Appl. No.: 15/862,658

(22) Filed: Jan. 5, 2018

(65) Prior Publication Data

US 2019/0213349 A1  Jul. 11, 2019

(51) Int. Cl.
| | | |
|---|---|---|
| *G06F 21/62* | (2013.01) | |
| *G06F 21/50* | (2013.01) | |
| *H04L 29/06* | (2006.01) | |
| *G06F 9/455* | (2018.01) | |
| *G06F 16/182* | (2019.01) | |
| *G06F 16/903* | (2019.01) | |

(52) U.S. Cl.
CPC ...... *G06F 21/6227* (2013.01); *G06F 9/45558* (2013.01); *G06F 16/182* (2019.01); *G06F 21/50* (2013.01); *H04L 29/06578* (2013.01); *G06F 16/903* (2019.01); *G06F 2009/45595* (2013.01)

(58) Field of Classification Search
CPC .... G06F 21/6227; G06F 16/182; G06F 21/50; G06F 9/45558; G06F 2009/45595; G06F 16/903; H04L 29/06578; H04L 63/0236
See application file for complete search history.

(56) References Cited

U.S. PATENT DOCUMENTS

| | | | | |
|---|---|---|---|---|
| 9,386,085 | B2 * | 7/2016 | Doron | ................ H04L 67/1023 |
| 2013/0304903 | A1 * | 11/2013 | Mick | ...................... H04L 67/16 |
| | | | | 709/224 |
| 2014/0359749 | A1 * | 12/2014 | Rieke | ................. H04L 63/1433 |
| | | | | 726/11 |
| 2018/0114012 | A1 * | 4/2018 | Sood | ................... G06F 12/1036 |
| 2018/0219773 | A1 * | 8/2018 | Li | .......................... H04L 45/64 |

* cited by examiner

*Primary Examiner* — Joseph P Hirl
*Assistant Examiner* — Thomas A Gyorfi
(74) *Attorney, Agent, or Firm* — SU IP Consulting (57) ABSTRACT

Example methods are provided for filter-based control information query in a software-defined networking (SDN) environment that includes a host and a network management entity. One example method may comprise identifying a first query key for the host to query for control information associated with the first query key from the network management entity; and applying a set membership filter to determine whether the first query key is possibly a member of a set of second query keys that are known to the network management entity. The method may also comprise, in response to determination that the first query key is possibly a member of the set of second query keys, generating and sending a query message to the network management entity over a control-plane channel to query for the control information associated with the first query key.

21 Claims, 8 Drawing Sheets

Host
(e.g., Host-A 110A)

Identify first query key to query for control information
210

↓

Apply set membership filter to determine whether first query key is possibly a member of set of second query keys
220

↓

First query key possibly a member of set?
230  — N →

↓ Y

Generate and send query message to network management entity to query for control information based on first query key
240

Do not generate and send query message to network management entity
250

FILTER-BASED CONTROL INFORMATION QUERY IN SOFTWARE-DEFINED NETWORKING (SDN) ENVIRONMENTS

BACKGROUND

Unless otherwise indicated herein, the approaches described in this section are not admitted to be prior art by inclusion in this section.

Virtualization allows the abstraction and pooling of hardware resources to support virtual machines in a Software-Defined Networking (SDN) environment, such as a Software-Defined Data Center (SDDC). For example, through server virtualization, virtualization computing instances such as virtual machines running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc.

Through SDN, benefits similar to server virtualization may be derived for networking services. For example, logical overlay networks that are decoupled from the underlying physical network infrastructure may be configured. Through a network management entity, control information relating to logical overlay networks, virtualized computing instances and hosts in the SDN environment may be collected and disseminated. Hosts may also send query messages to request for control information from the network management entity. However, in practice, it may not be efficient to send the query messages to the network management entity. Further, the network management entity may be susceptible to malicious attacks by a third party.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to control information query will now be explained in more detail using FIG. 1, which is a schematic diagram illustrating example software-defined networking (SDN) environment 100 in which filter-based control information query may be performed. It should be understood that, depending on the desired implementation, SDN environment 100 may include additional and/or alternative components than that shown in FIG. 1.

Figure 1:
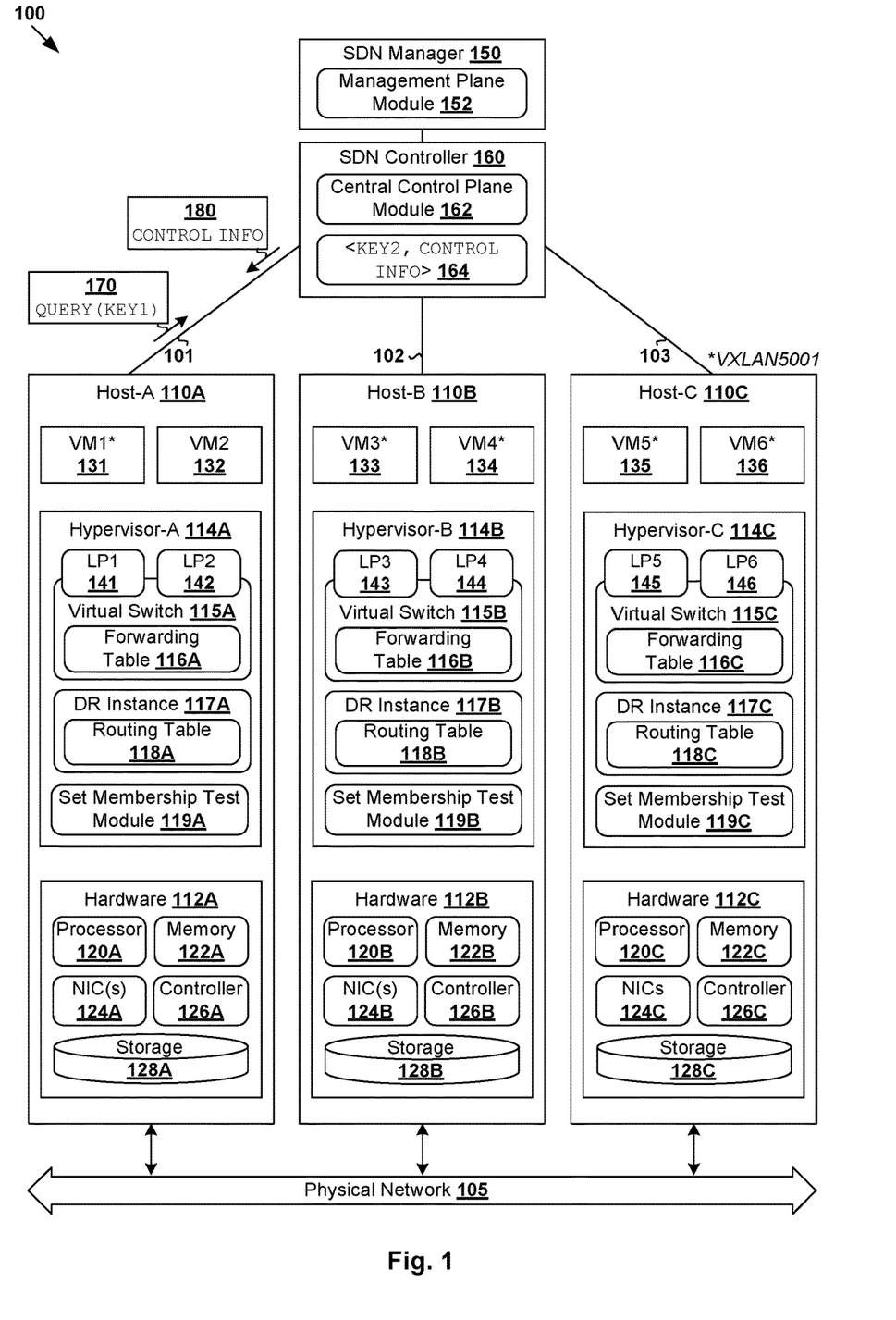
FIG. 1 is a schematic diagram illustrating an example software-defined networking (SDN) environment in which filter-based control information query may be performed.

In the example in FIG. 1, SDN environment 100 includes multiple hosts, such as host-A 110A, host-B 110B and host-C 110C that are inter-connected via physical network 105. Each host 110A/110B/110C includes suitable hardware 112A/112B/112C and virtualization software (e.g., hypervisor-A 114A, hypervisor-B 114B, hypervisor-C 114C) to support various virtual machines (VMs). For example, host-A 110A supports VM1 131 and VM2 132; host-B 110B supports VM3 133 and VM4 134; and host-C 110C supports VM5 135 and VM6 136. In practice, SDN environment 100 may include any number of hosts (also known as a "computing devices", "host computers", "host devices", "physical servers", "server systems", etc.), where each host may be supporting tens or hundreds of VMs.

Although examples of the present disclosure refer to VMs, it should be understood that a "virtual machine" running on a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system. The term "hypervisor" may refer generally to a software layer or component that supports the execution of multiple virtualized computing instances, including system-level software in guest VMs that supports namespace containers, etc.

Hypervisor 114A/114B/114C maintains a mapping between underlying hardware 112A/112B/112C and virtual resources allocated to VMs 131-136. Hardware 112A/112B/112C includes suitable physical components, such as central processing unit(s) or processor(s) 120A/120B/120C; memory 122A/122B/122C; physical network interface controllers (NICs) 124A/124B/124C; and storage disk(s) 128A/128B/128C accessible via storage controller(s) 126A/126B/126C, etc. Virtual resources are allocated to each VM to support a guest operating system (OS) and applications. For example, corresponding to hardware 112A/112B/112C, the virtual resources may include virtual CPU, virtual memory, virtual disk, virtual network interface controller (VNIC), etc.

Hypervisor 114A/114B/114C further implements virtual switch 115A/115B/115C and logical distributed router (DR) instance 117A/117B/117C to handle egress packets from, and ingress packets to, corresponding VMs 131-136. In SDN environment 100, logical switches and logical distributed routers may be implemented in a distributed manner and can span multiple hosts to connect VMs 131-136. For example, logical switches that provide logical layer-2 connectivity may be implemented collectively by virtual switches 115A-C and represented internally using forwarding tables 116A-C at respective virtual switches 115A-C. Forwarding tables 116A-C may each include entries that collectively implement the respective logical switches. Further, logical distributed routers that provide logical layer-3 connectivity may be implemented collectively by DR instances 117A-C and represented internally using routing tables 118A-C at respective DR instances 117A-C. Routing tables 118A-C may be each include entries that collectively implement the respective logical distributed routers.

Virtual switch 115A/115B/115C also maintains forwarding information to forward packets to and from corresponding VMs 131-136. Packets are received from, or sent to, each VM via an associated logical port. For example, logical ports 141-146 are associated with respective VMs 131-136. As used herein, the term "packet" may refer generally to a group of bits that can be transported together from a source to a destination, such as message, segment, datagram, etc. The term "layer-2" may refer generally to a Media Access Control (MAC) layer; "layer-3" to a network or Internet Protocol (IP) layer; and "layer-4" to a transport layer (e.g., using transmission control protocol (TCP) or user datagram protocol (UDP)) in the Open System Interconnection (OSI) model, although the concepts described herein may be used with other networking models.

It should be understood that the term "logical port" may refer generally to a port on a logical switch to which a virtualized computing instance is connected. A "logical switch" may refer generally to an SDN construct that is collectively implemented by virtual switches 115A-C in the example in FIG. 1, whereas a "virtual switch" may refer generally to a software switch or software implementation of a physical switch. In practice, there is usually a one-to-one mapping between a logical port on a logical switch and a virtual port on virtual switch 115A/115B/115C. However, the mapping may change in some scenarios, such as when the logical port is mapped to a different virtual port on a different virtual switch after migration of the corresponding virtualized computing instance (e.g., when the source host and destination host do not have a distributed virtual switch spanning them).

SDN manager 150 and SDN controller 160 are example network management entities that facilitate implementation of software-defined (e.g., logical overlay) networks SDN environment 100. One example of an SDN controller is the NSX controller component of VMware NSX® (available from VMware, Inc.) that operates on a central control plane (also referred as "control plane"). SDN controller 160 may be a member of a controller cluster (not shown for simplicity) that is configurable using SDN manager 150 operating on a management plane. Network management entity 150/160 may be implemented using physical machine(s), VM(s), or both.

A logical overlay network (also known as "logical network") may be formed using any suitable tunneling protocol, such as Virtual eXtensible Local Area Network (VX-LAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts. In the example in FIG. 1 (see asterisks), VM1 131 on host-A 110A, VM3 133 and VM4 134 on host-B 110B, as well as VM5 135 and VM6 136 on host-C 110C are located on the same logical layer-2 segment, i.e., VXLAN segment with VXLAN network identifier (VNI)=5001. Note that the terms "logical overlay network" and "logical layer-2 segment" may be used interchangeably to refer generally to a logical layer-2 domain created in SDN environment 100.

Each host 110A/110B/110C also maintains data-plane connectivity with other host(s) via physical network 105 to facilitate communication among VMs located on the same logical overlay network. Hypervisor 114A/114B/114C may implement a virtual tunnel endpoint (VTEP) to encapsulate and decapsulate packets with an outer header (also known as a tunnel header) identifying the relevant logical overlay network (e.g., VNI=5001). In the example in FIG. 1, hypervisor-A 114A implements a first VTEP-A associated with (IP address=IP-A, MAC address=MAC-A), hypervisor-B 114B implements a second VTEP-B with (IP-B, MAC-B) and hypervisor-C 114C implements a third VTEP with (IP-C, MAC-C). Encapsulated packets may be sent via an end-to-end, bi-directional communication path (known as a tunnel) established between a pair of VTEPs over physical network 105.

SDN controller 160 is responsible for collecting and disseminating control information to host 110A/110B/110C, such as network topology information, mobility of the VMs 131-136, firewall rules, runtime information relating to logical overlay networks, etc. The control information may be sent and received via control-plane channel 101/102/103 established between a local control plane (LCP) agent (not shown for simplicity) at host 110A/110B/110C and central control plane module 162 of SDN controller 160 via. In practice, any suitable protocol may be used to establish control-plane channel 101/102/103, such as TCP over Secure Sockets Layer (SSL), etc. Hosts 110A-C may send query messages to request for control information from SDN controller 160 via control-plane channel 101/102/103. However, in practice, it may not be efficient to send the query messages to SDN controller 160. Also, SDN controller 160 may be susceptible to malicious attacks by a third party during control information query.

One example of control information query relates to address resolution, which is a process of resolving or translating a known protocol address (e.g., IP address) to an unknown hardware address. In IP-based networks, address resolution may be performed using Address Resolution Protocol (ARP) for IP version 4 (IPv4) addresses or Neighbor Discovery Protocol (NDP) for IP version 6 (IPv6) addresses. For example in FIG. 1, consider the communication between a pair of VMs, such as VM1 131 on host-A 110A and VM5 135 on host-C 110C on VXLAN5001. When VM1 131 wishes to communicate with VM5 135, VM1 131 needs to find out the hardware address (e.g., MAC address) of VM5 135.

Conventionally, the process of address resolution may involve VM1 131 may broadcasting an ARP request message within VXLAN5001 to translate IP address=IP5 of VM5 135 to its corresponding MAC address. Since the ARP request message is broadcasted, VM3 133 on host-B 110B, as well as VM5 135 and VM6 136 on host-C 110C will receive the ARP request message. Each recipient will examine whether its IP address matches with that in the ARP request message. In this case, VM5 135 will respond with an ARP response message with MAC address=MAC5 to VM1 131. In response, VM1 131 caches (IP5, MAC5) in an ARP table entry. If VM1 131 does not communicate with VM5 135 within a predefined period of time, the ARP table entry will expire, after which the above process will have to be repeated. The address resolution process may be performed by other VMs in a similar manner. In practice, the broadcast nature of the address resolution process may lead to various problems, such as ARP flooding, etc.

One conventional approach to reduce ARP flooding is address resolution suppression through ARP proxy handling. In this case, prior to broadcasting the ARP request message, host-A 110A (e.g., hypervisor-A 114A in particular) may check whether a local ARP table maintained by hypervisor-A 114A stores the required (IP5, MAC5) entry. If yes, an ARP response message will be sent to VM1 131 without broadcasting the ARP request message. Otherwise, a query message (e.g., ARP proxy request) will be generated and sent to SDN controller 160. If an ARP table maintained by SDN controller 160 has the required (IP5, MAC5) entry, SDN controller 160 will respond with the entry. Otherwise, SDN controller 160 will send an invalid result message to host-A 110A, which then broadcasts the ARP request message.

Although useful for reducing ARP flooding in SDN environment 100, the above conventional approach may lead to other problems, such as increased security risks and processing burden at SDN controller 160, etc. For example, a malicious VM may ping a number of (unknown) IP addresses to cause a large number of query messages to be generated and sent to SDN controller 160. This creates a lot of unnecessary traffic on control-plane channel 101/102/103 between host 110A/110B/110C and SDN controller 160. Also, this increases the processing burden on SDN controller 160 to handle the query messages. In some cases, since SDN controller 160 is deployed as a dedicated service node for a number of hosts, this may adversely affect the performance of SDN controller 160 to perform control operations that rely on control-plane channel 101/102/103. These problems may be exacerbated when there are tens or hundreds of hosts and virtualized computing instances in SDN environment 100.

Filter-Based Control Information Query

According to examples of the present disclosure, a filter-based approach may be performed to improve the process of control information query. In particular, a set membership filter may be applied before a query message is generated and sent to SDN controller 160. By applying the set membership filter, host 110A/110B/110C may determine whether a "first query key" (e.g., IP address in an ARP request message) is possibly a member of a set of second query keys (e.g., set of IP addresses in an ARP table) known to SDN controller 160. If not, a query message will not be sent. This way, the likelihood of sending unnecessary query messages to SDN controller 160 may be reduced, which in turn reduces unnecessary traffic on control-plane channels 101-103. Instead of handling the unnecessary query messages, SDN controller 160 may dedicate its resources on more important operations, such automated configurations, run-time information updates, etc.

Figure 2:
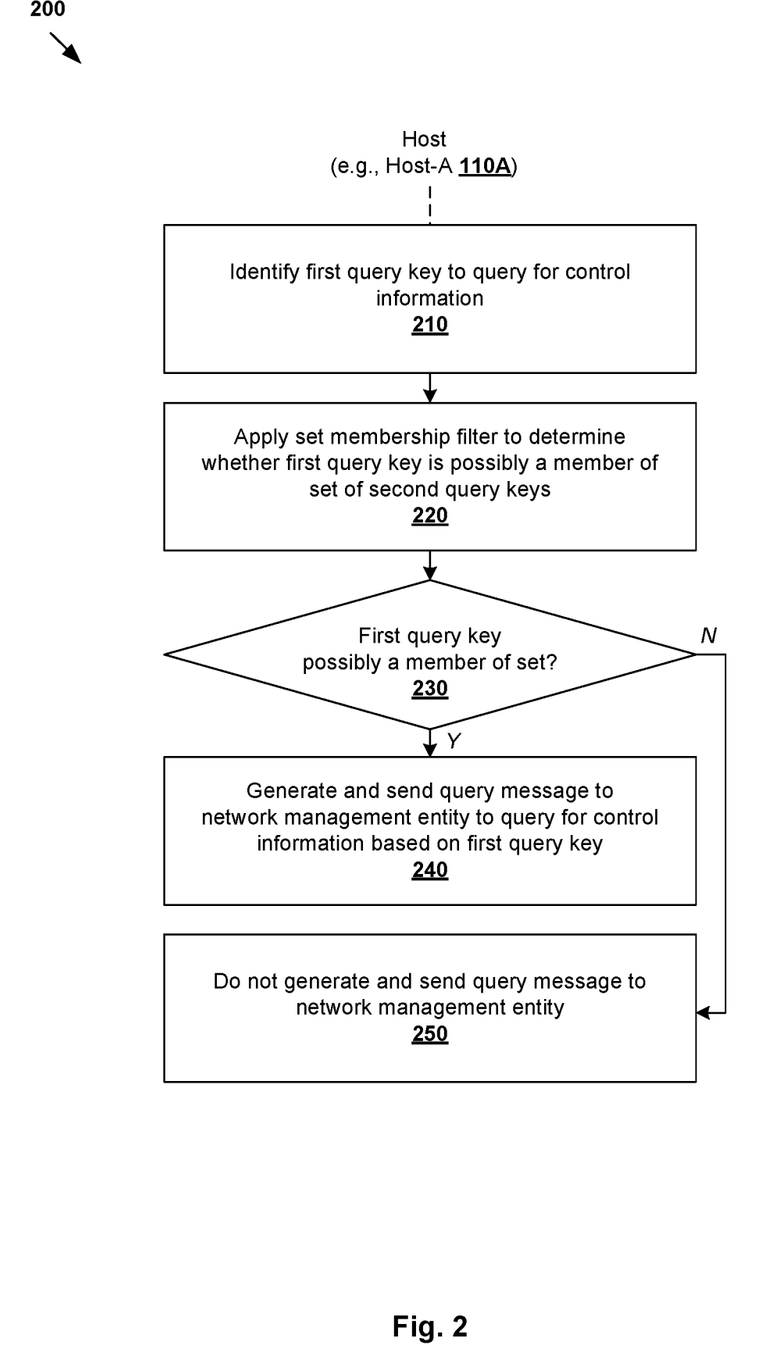
FIG. 2 is a flowchart of an example process for a host to perform filter-based control information query in an SDN environment.

In more detail, FIG. 2 is a flowchart of example process 200 for a host to perform filter-based control information query in SDN environment 100. Example process 200 may include one or more operations, functions, or actions illustrated by one or more blocks, such as 210 to 250. The various blocks may be combined into fewer blocks, divided into additional blocks, and/or eliminated depending on the desired implementation. In practice, example process 200 may be implemented using 110A/110B/110C, such as using hypervisor 114A/114B/114C and more particularly set membership test module 119A/119B/119C, etc. In the following, various examples will be explained using host-A 110A as an example "host," and SDN controller 160 as a "network management entity."

At 210 in FIG. 2, host-A 110A identifies a first query key for host-A 110A to query for control information associated with the first query key from SDN controller 160. At 220, host-A 110A applies a set membership filter on the first query key to determine whether the first query key (e.g., "KEY1" in FIG. 1) is possibly a member of a set of second query keys (e.g., "KEY2" at 164 in FIG. 1) that are known to SDN controller 160. At 230 and 240, in response to determination that the first query key is possibly a member of the set of second query keys, host-A 110A generates and sends a query message to SDN controller 160 over control-plane channel 101 to query for the control information associated with the first query key (see 170 and 180 in FIG. 1). Otherwise, at 250, host-A 110A does not generate and send the query message to SDN controller 160.

As used herein, the term "set membership filter" may refer suitable filter for determining whether the first query key is possibly a member of the set of second query keys. As will be explained further using FIG. 3 and FIG. 4, one example of a set membership filter is a Bloom filter, which is an approximate set membership filter that includes k hash functions and an array with m elements. In this case, block 220 in FIG. 2 may involve applying the k hash functions on the first query key to map the first query keys onto k elements in the array; and determining whether the first query key is possibly a member of the set of second query keys based on the k elements. The set membership filter may be configured based on configuration information from SDN controller 160.

The terms "first query key" and "set of second query keys" may refer to any suitable query keys based on which control information may be queried or obtained. A first example relating to address resolution will be explained using FIG. 3 to FIG. 7, in which case IP addresses are used as example "query keys" and associated MAC addresses as "control information." In this case, block 210 may involve host-A 110A performing snooping to detect, from a virtualized computing instance (e.g., VM1 131) supported by host-A 110A, an address resolution request message that specifies an IP address associated with a destination (e.g., VM5 135) with which the virtualized computing instance wishes to communicate. In this case, the IP address may be identified to be the first query key for retrieving control information that includes a MAC address associated with the destination.

According to the first example, in response to host-A 110A receiving control information that includes the MAC address from SDN controller 160 responsive to the query message, host-A 110A may generate and send an address resolution response message identifying the IP address and MAC address to the virtualized computing instance. Otherwise, in response to host-A 110A determining that the first query key is not a member of the set of second query keys after applying the set membership filter, or receiving an invalid result message from SDN controller 160 responsive to the query message, host-A 110A may broadcast the address resolution request message within a logical overlay network (e.g., VXLAN5001) in which the virtualized computing instance (e.g., VM1) is located. The invalid result message may indicate a false positive produced by the set membership filter.

A second example will be explained using FIG. 8, in which case MAC addresses may be used as "query keys" and associated VTEP information as "control information." In this case, block 210 may involve host-A 110A identifying a MAC address (e.g., MAC5) to be the first query key for retrieving control information that includes virtual tunnel endpoint (VTEP) information associated with a destination host (e.g., host-C 110C). In this case, the destination host may support a destination virtualized computing instance (e.g., VM1 135) associated with the MAC address. Depending on the desired implementation, any additional and/or alternative query keys and control information may be used, such as Universally Unique Identifiers (UUIDs), logical overlay network identifiers (e.g., VNI), VTEP identifiers, etc.

Set Membership Filter

Example configuration of a set membership filter to facilitate address resolution will be explained using FIG. 3, FIG. 4A and FIG. 4B. Although the examples of below will be explained using a Bloom filter using a counting array, it should be understood that any alternative and/or additional set membership test filter(s) may be used. For example, variants that may be used include compressed Bloom filter, spectral Bloom filter, weighted Bloom filter, independently scalable Bloom filter, incremental Bloom filter, restricted fill Bloom filter, adaptive Bloom filter, etc.

Figure 3:
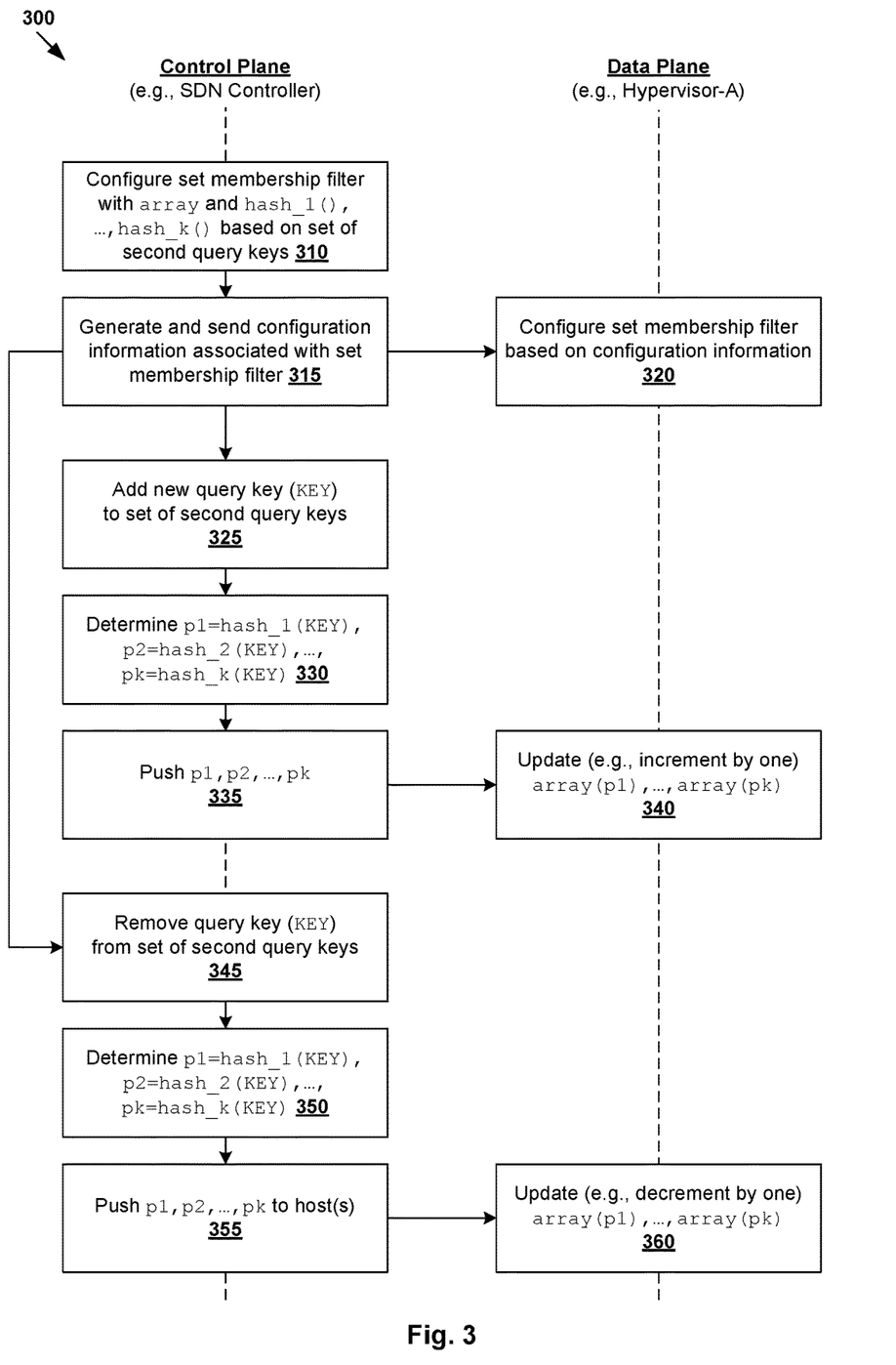
FIG. 3 is a schematic diagram of an example process for configuring a set membership filter in an SDN environment.
Figure 4A:
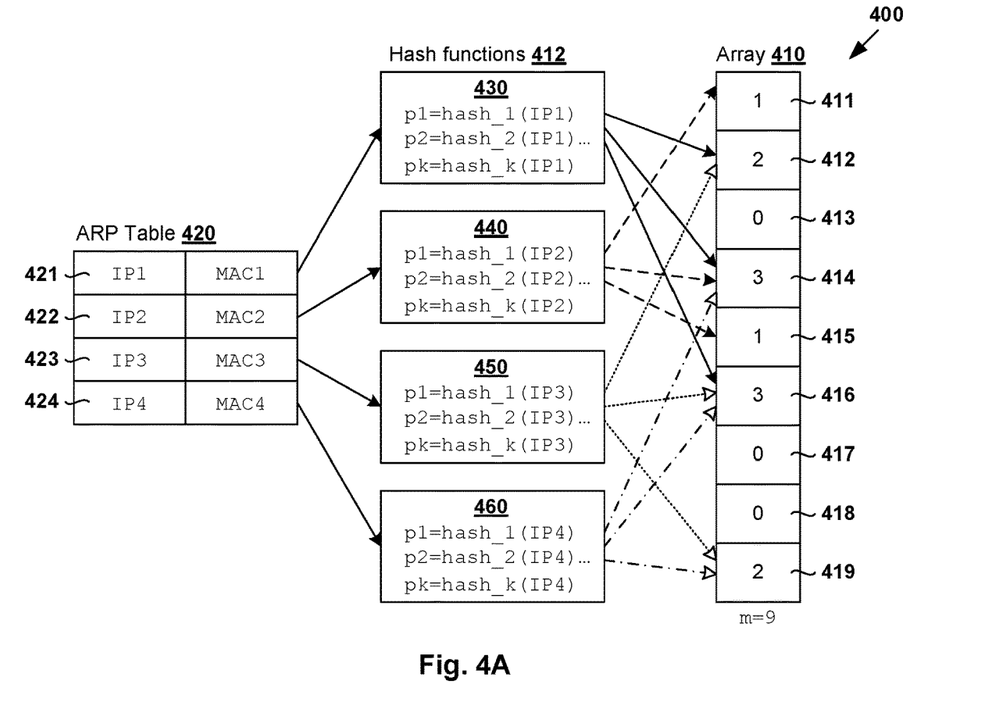
FIG. 4A is a schematic diagram illustrating an example configuration of a set membership filter according to the example in FIG. 3.
Figure 4B:
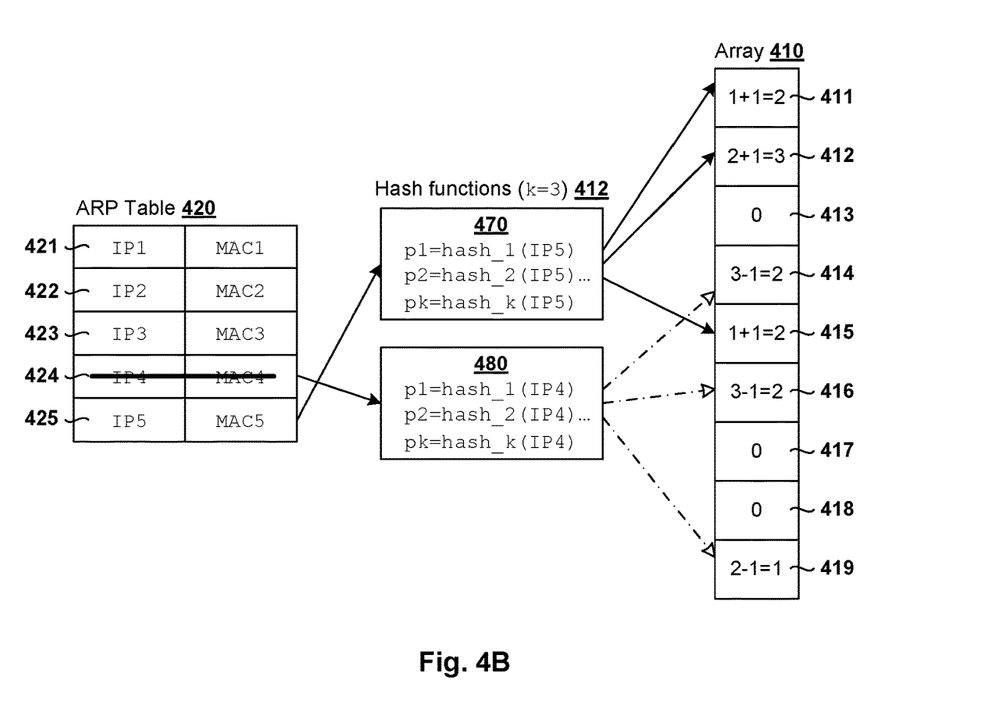
FIG. 4B is a schematic diagram illustrating example updates of a set membership filter according to the example in FIG. 3.

In more detail, FIG. 3 is a schematic diagram of example process 300 for configuring a set membership filter in SDN environment 100. Example process 300 may include one or more operations, functions, or actions illustrated at 310 to 360. The various operations, functions or actions may be combined into fewer blocks, divided into additional blocks, and/or eliminated depending on the desired implementation. FIG. 4A is a schematic diagram illustrating example configuration of a set membership filter according to the example in FIG. 3, and FIG. 4B is a schematic diagram illustrating example updates of a set membership filter according to the example in FIG. 3. Throughout the present disclosure, a "data plane" may be implemented by hypervisor-A 114A (e.g., using a kernel module such as set membership test module 119A), and a "control plane" by SDN controller 160 (e.g., central control plane module 162) in SDN environment 100.

At 310 in FIG. 3, SDN controller 160 configures a set membership filter based on a set of addresses that are known to SDN controller 160. For example in FIG. 4A, Bloom filter 400 is a probabilistic algorithm for testing set membership using a counting array of m elements (see 410) and k hash functions (see 412) denoted as hash_1( ), hash_2( ), . . . , hash_k( ), each with range {1, . . . , m}. Each array element is initialized to zero. Bloom filter 400 may be configured based on IP addresses in ARP table 420 maintained by SDN controller 160, which stores IP addresses ("second query keys") and MAC addresses ("control information"). In practice, an ARP table is generally stored on the control plane for each logical switch in SDN environment 100. In the example in FIG. 4, ARP table 420 is associated with a logical switch (not shown for simplicity) connecting VM1 131, VM3 133, VM4 134, VM5 135 and VM6 136 located on a logical overlay network (e.g., VXLAN5001).

ARP table 420 includes four entries: <IP1, MAC1> associated with VM1 131 (see 421); <IP2, MAC2> associated with VM2 132 (see 422); <IP3, MAC3> associated with VM3 133 (see 423); and <IP4, MAC4> associated with VM4 134 (see 424). At a first iteration (see 430 in FIG. 4A), counting array 410 is updated based on first entry <IP1, MAC1>. In this case, k elements are updated at indices selected using k hash functions. Based on IP address=IP1, the indices are p1=hash_1(IP1), p2=hash_2(IP1), . . . , pk=hash_k(IP1). The corresponding array elements may be denoted as array(p1), array(p2), . . . , array(p3). Using m=9 and k=3, array(p1=2), array(p2=4) and array(p3=6) are incremented by one (see arrows from 430 to 412, 414, 416).

At a second iteration, counting array 410 is updated based on <IP2, MAC2>. By applying k hash functions on IP address=IP2 and mapping the results to counting array 410, array(p1=1), array(p2=4) and array(p3=5) are incremented by one (see arrows from 440 to 411, 414, 415). At a third iteration, counting array 410 is updated based on <IP3, MAC3>. By applying k hash functions on IP address=IP3, array(p1=2), array(p2=6) and array(p3=9) are incremented (see arrows from 450 to 412, 416, 419). At a fourth iteration (see 460 in FIG. 4A), counting array 410 is updated based on <IP4, MAC4>. By applying k hash functions on IP address=IP4, array(p1=4), array(p2=6) and array(p3=9) are incremented (see arrows from 460 to 414, 416, 419).

At 315 and 320 in FIG. 3, SDN controller 160 generates and sends configuration information associated with bloom filter 400 to host-A 110. This causes host-A 110A to store counting array 410 and k hash functions 412 to facilitate filter-based control information query. In practice, information in ARP table 420 may be collected by SDN controller 160 using any suitable approach, such Dynamic Host Configuration Protocol (DHCP) snooping, address discovery, etc. ARP table 420 may be updated to add a new IP address or remove an existing IP address. In this case, SDN controller 160 may configure host-A 110 to update counting array 410.

At 325 and 330 in FIG. 3, in response to adding a new query key=IP address to the set of addresses, SDN controller 160 determines corresponding indices of counting array 410 that should be updated (e.g., incremented). In the example in FIG. 4B, consider the addition of new entry <IP5, MAC5> to ARP table 420. Referring to 470 in FIG. 4B, SDN controller 160 applies k hash functions on IP address=IP5 to determine p1=hash_1(IP5), p2=hash_2(IP5) and p3=hash_3 (IP5). At 335 and 340 in FIG. 3, SDN controller 160 sends or pushes the indices to host-A 110A to cause host-A 110A to update counting array 410 by incrementing elements at respective indices p1=1, p2=2 and p3=5 (see arrows from 470 to 411, 412, 415 in FIG. 4B).

At 345 and 350 in FIG. 3, in response to removing an existing IP address from ARP table 420, SDN controller 160 determines corresponding elements of counting array 410 that should be decremented. For example, consider the removal of <IP4, MAC4> (see 424 in FIG. 4B). Referring to 480 in FIG. 4B, SDN controller 160 applies k hash functions on IP address=IP4 to determine indices p1=hash_1(IP4), p2=hash_2(IP4) and p3=hash_3(IP4). At 355 and 360 in FIG. 3, SDN controller 160 pushes the indices to host-A 110A to cause host-A 110A to update counting array 410 by decrementing elements at respective indices p1=4, p2=6 and p3=9 (see arrows from 480 to 414, 416, 419 in FIG. 4B). In practice, instead of pushing indices p1, . . . , pk to host-A 110A at blocks 335 and 355, SDN controller 160 may push updated counting array 410, which will be stored by host-A 110A for subsequent set membership tests.

Address Resolution

Filter-based control information query during address resolution will be explained using FIG. 5, which is a flowchart of first example detailed process 500 for filter-based control information query in SDN environment 100. Example process 500 may include one or more operations, functions, or actions illustrated at 505 to 590. The various operations, functions or actions may be combined into fewer blocks, divided into additional blocks, and/or eliminated depending on the desired implementation. Similar to the example in FIG. 3, the "data plane" in FIG. 3 may be implemented by hypervisor-A 114A (e.g., using a kernel module such as set membership test module 119A), and the "control plane" by SDN controller 160 (e.g., central control plane module 162). Several scenarios will be explained below using FIG. 6 and FIG. 7.

(a) Address is Possibly a Member (Known Address)

Figure 5:
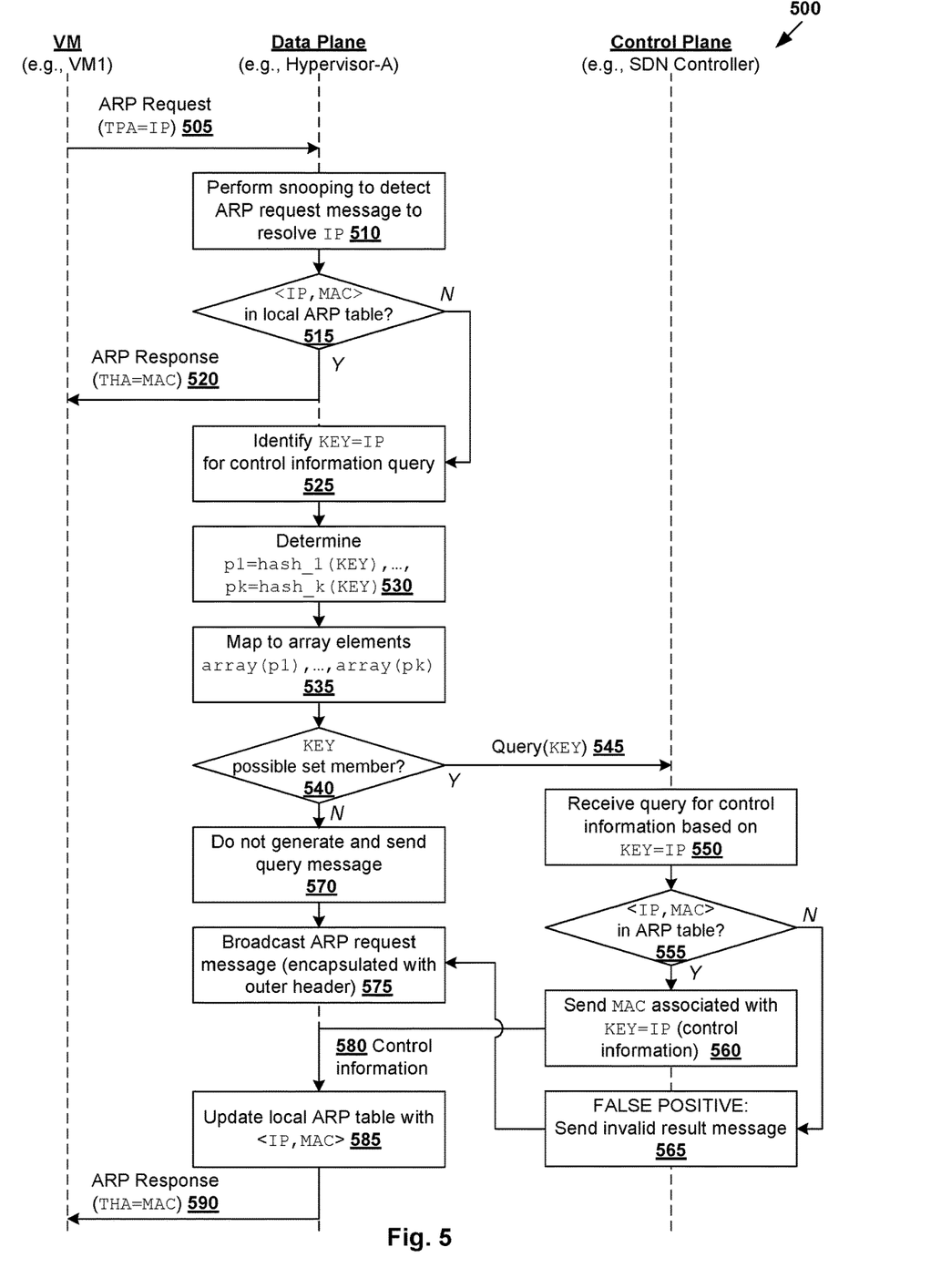
FIG. 5 is a flowchart of a first example detailed process for filter-based control information query in an SDN environment.
Figure 6:
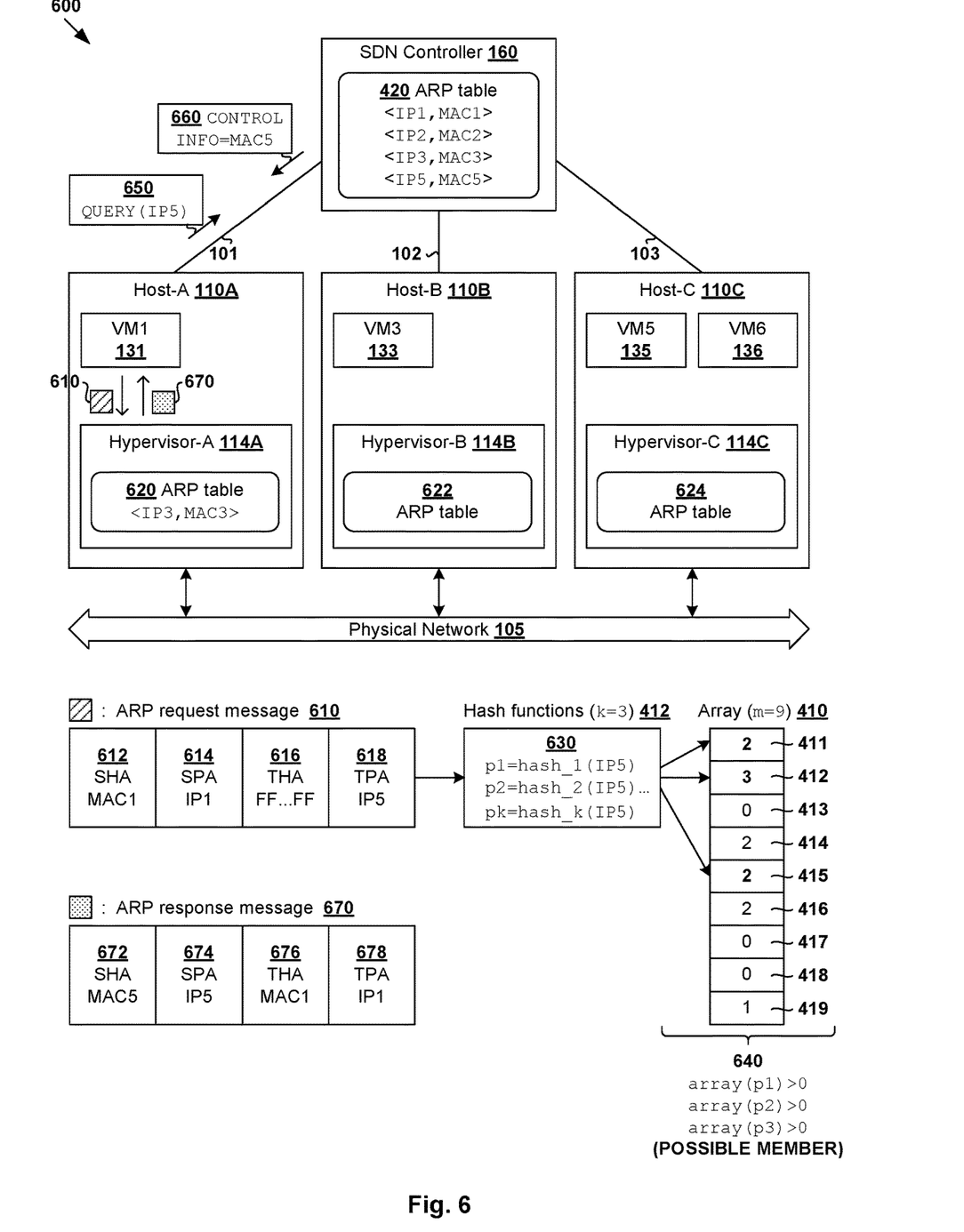
FIG. 6 is a schematic diagram illustrating a first example of filter-based control information query when a query key is possibly a set member according to the example in FIG. 5.

FIG. 6 is a schematic diagram illustrating first example 600 of filter-based control information query when a query key is possibly a set member according to the example in FIG. 5. In this example, consider a scenario in which VM1 131 wishes to communicate with destination IP address=IP5. Before VM1 131 can send packets to the destination IP address, VM1 131 needs to resolve the destination IP address to a MAC address using an address resolution process.

At 505 in FIG. 5, VM1 131 generates and sends ARP request message 610 to resolve IP address=IP5 to a MAC address. ARP request message 610 specifies four addresses: source hardware address (SHA)=source MAC1 of VM1 131 (see 612); source protocol address (SPA)=source IP1 of VM1 131 (see 614); target hardware address (THA)=destination MAC address (see 616) and target protocol address (TPA)=destination IP5 (see 618). Since the destination MAC address is unknown to VM1 131, THA is set to a broadcast MAC address (e.g., FF:FF:FF:FF:FF:FF).

Although not shown in FIG. 6, ARP request message 610 generally includes additional fields, such as hardware type (HTYPE)=type of hardware address (e.g., HTYPE=1 for MAC address); protocol type (PTYPE)=type of protocol address (e.g., PTYPE=0x0800 for IP version 6 (IPv4) address); hardware length (HLEN)=hardware address length (e.g., HLEN=6 octets for a MAC address); protocol length (PLEN)=protocol address length (e.g., PLEN=6 octets for an IPv4 address); and operation (OPER) indicates whether the packet is an ARP request (i.e., OPER=1).

At 510 in FIG. 5, hypervisor-A 114A performs snooping to detect ARP request message 610 originated from VM1 131. At 515 in FIG. 5, in response to determination that IP address=IP5 is found in its local ARP table 620, hypervisor-A 114A performs address resolution suppression by generating and sending an ARP response message to VM1 131. In the example in FIG. 6, local ARP table 620 maintained by hypervisor-A 114A is a subset of (global) ARP table 420 at SDN controller 160. Since local ARP table 620 does not include any entry matching IP address=IP5 in request message 610, hypervisor-A 114A proceeds to apply a set membership filter according to blocks 525-540 in FIG. 5.

In the example in FIG. 6, Bloom filter 400 (m=9 and k=3) configured according to FIG. 3 and FIG. 4 is applied. This involves hypervisor-A 114A identifying query key=IP5 from ARP request message 610, and applying k hash functions on the query key. This is to map IP5 to k elements of counting array 410 at respective indices p1=hash_1(IP5), p2=hash_2(IP5) and p3=hash_k(IP5). The corresponding array elements are array(p1=1)=2, array(p2=2)=3 and array(p3=5)=2 (see arrows from 630 to 411, 412, 415 in FIG. 6). Since the array elements are each greater than zero, hypervisor-A 114A determines that query key=IP5 is possibly a member of the set of IP addresses known to SDN controller 160 (i.e., stored in ARP table 420) and based on which counting array 410 is configured. See 640 in FIG. 6.

At 540 and 545 in FIG. 5, in response to determination that query key=IP5 in ARP request message 610 is possibly a member of the set of IP addresses known to SDN controller 160, hypervisor-A 114A generates and sends a query message (see 650 in FIG. 6) to SDN controller 160 to obtain control information that resolves IP address=IP5 to a MAC address. Query message 650 is sent via control-plane channel 101 between host-A 110A and SDN controller 160.

At 550 and 555 in FIG. 5, in response to receiving query message 650 from hypervisor-A 114A, SDN controller 160 determines whether IP address=IP5 is found in its ARP table 420. If yes, at 560 in FIG. 5, SDN controller 160 generates and sends control information 660 that includes MAC address=MAC5 associated with IP address=IP5, thereby providing the requested protocol-to-hardware address mapping information <IP5, MAC5>. Control information 660 is sent via control-plane channel 101 between host-A 110A and SDN controller 160.

At 580 and 585 in FIG. 5, in response to receiving control information 660 from SDN controller 160, hypervisor-A 114A updates local ARP table 620 with new entry <IP5, MAC5>. At 590 in FIG. 5, hypervisor-A 114A generates and sends ARP response message 670 to source VM1 131. ARP response message 670 specifies SHA=MAC5 (see 672) and SPA=IP5 (see 674) associated with VM5 135, as well as THA=MAC1 (see 676) and TPA=IP1 (see 678) associated with VM1 131. From the perspective of VM1 131, ARP response message 670 appears to have originated from VM5 135, the IP address of which is now resolved.

(b) Address is Not a Member (Unknown Address)

Figure 7:
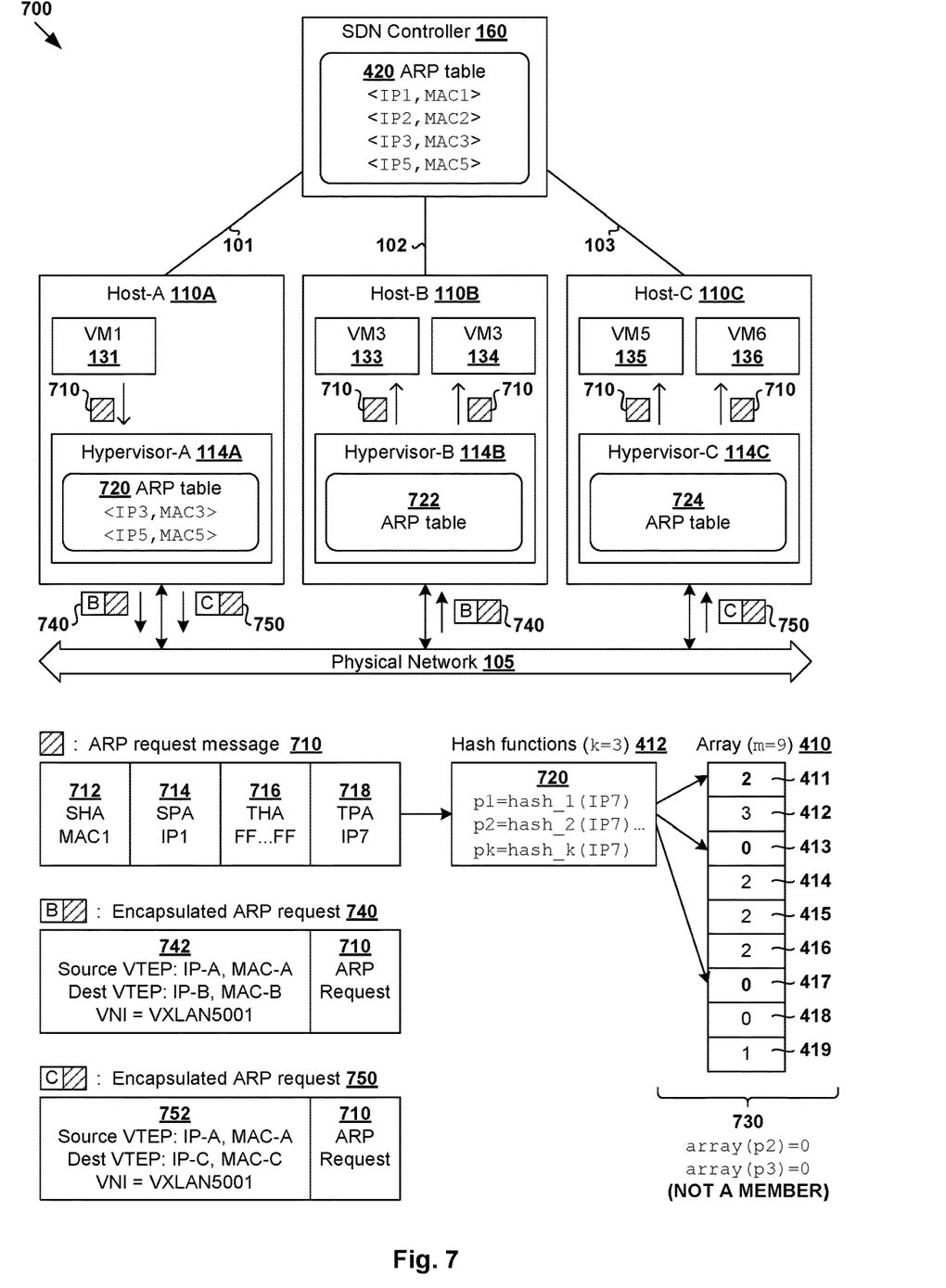
FIG. 7 is a schematic diagram illustrating a second example of filter-based control information query when a query key is not a set member according to the example in FIG. 5.

FIG. 7 is a schematic diagram illustrating second example 700 of filter-based control information query when a query key is not a set member according to the example in FIG. 5. In this example, consider a scenario in which VM1 131 wishes to communicate with a different destination IP address=IP7. Before VM1 131 can send packets to destination IP address=IP7, VM1 131 needs to resolve the destination IP address to a MAC address using an address resolution process.

At 505 in FIG. 5, VM1 131 generates and sends ARP request message 710 to resolve IP address=IP3 to a MAC address. As shown in detail in FIG. 7, ARP request message 710 specifies SHA=MAC1 of VM1 131 (see 712); SPA=IP1 of VM1 131 (see 714), THA=broadcast MAC address (see 716) and TPA=IP7 (see 718).

At 510 in FIG. 5, hypervisor-A 114A performs snooping to detect ARP request message 710 from VM1 131. At 515 in FIG. 5, in response to determination that IP address=IP7 is not found in its local ARP table 720, hypervisor-A 114A proceeds to apply a set membership filter according to blocks 525-540 in FIG. 5.

In the example in FIG. 7, hypervisor-A 114A identifies query key=IP7 from ARP request message 710, and applying k hash functions on the query key. This is to map IP7 to k elements of counting array 410 at respective indices p1=hash_1(IP7), p2=hash_2(IP7) and p3=hash_k(IP7). The corresponding array elements are array(p1=1)=2, array (p2=3)=0 and array(p3=7)=0 (see 411, 413, 417 in FIG. 7). Since at least one array element mapped to IP7 is non-zero, hypervisor-A 114A may then determine that IP address=IP7 does not belong to a set of IP addresses known to SDN controller 160 and based on which counting array 410 is configured. See 720 and 730 in FIG. 7.

At 570 in FIG. 5, in response to determination that IP7 does not belongs to a set of IP addresses known to SDN controller 160, hypervisor-A 114A does not generate and send any query message to SDN controller 160. Instead, at 575 in FIG. 5, hypervisor-A 114A broadcasts ARP request message 710, such as within a logical overlay network in which source VM1 131 is located.

In the example in FIG. 7, ARP request message 710 is broadcasted in the form of encapsulated request messages 740, 750 to respective host-B 110B and host-C 110C. First encapsulated ARP request message 740 is generated by encapsulating ARP request message 710 with outer header 742 addressed from source VTEP-A at hypervisor-A 114A to destination VTEP-B at hypervisor-B 114B. Second encapsulated ARP request message 750 is generated by encapsulating ARP request message 710 with outer header 752 addressed from source VTEP-A at hypervisor-A 114A to destination VTEP-C at hypervisor-C 114C.

Outer header 742/752 includes a logical overlay network header (e.g., VXLAN header); an outer layer-4 header (e.g., TCP or UDP header); an outer layer-3 header (e.g., IP header) and an outer layer-2 header (e.g., MAC header). The VXLAN header includes a 24-bit VXLAN Network Identifier (VNI) of the logical network (e.g., VNI=VXLAN5001). The outer IP header includes a source IP address (e.g., IP-A) associated with source VTEP-A, and a destination IP address (e.g., IP-B or IP-C) associated with destination VTEP-B or VTEP-C. The outer MAC header includes a source MAC address (e.g., MAC-A) associated with VTEP-A, and a destination MAC (e.g., MAC-B or MAC-C) associated with VTEP-B or VTEP-C.

At host-B 110B, in response to receiving first encapsulated ARP request message 740, outer header 742 will be decapsulated (i.e., removed) before ARP request message 710 is sent to VM3 133 and VM4 134 respectively. Similarly at host-C 110C, in response to receiving second encapsulated ARP request message 750, decapsulation is performed before ARP request message 710 is sent to VM5 135 and VM6 136 respectively. In a first scenario, since none of the recipients is associated with IP address=IP7 in ARP request message 710, they will not respond. In a second scenario, IP7 may be an updated IP address of VM3 133, for example. In this case, an ARP response message specifying (IP7, MAC3) may be sent to VM1 131. Hypervisor-A 114A may also perform snooping to update ARP table 720 with (IP7, MAC3). In practice, it is possible that SDN controller 160 is not be aware of the updated IP address (i.e., IP7) due to a delay in its IP address discovery mechanism, for example.

Examples of the present disclosure should be contrasted against conventional approaches that necessitate hypervisor-A 114A to send a query message to SDN controller 160 after block 515 (no). According to these conventional approaches, hypervisor-A 114A would send a query message to SDN controller 160 to obtain control information (i.e., MAC address) associated with IP address=IP7 without applying any set membership filter. However, since IP7 does not belong to the set of IP addresses in in ARP table 420 maintained by SDN controller 160, the query message would not have returned any valid result. This leads to hypervisor-A 114A broadcasting ARP request message 710 according to block 575, which leads to the same outcome shown in FIG. 7 but increases the ARP request latency.

In contrast, according to examples of the present disclosure, the extra time and effort of sending an unnecessary query message to SDN controller 160 may be avoided (or its likelihood reduced) by applying the set membership filter, thereby improving efficiency. In the context of address resolution, examples of the present disclosure may protect the central control plane from being attacked by malicious third parties, such as through ARP flooding. In practice, the time complexity of vector matching is generally O(k), which places a relatively low processing burden on hosts 110A-C.

(c) False Positive

The performance of a set membership filter may be measured using a rate of false positives. In practice, false positives may occur when blocks 525-540 give positive answers to addresses that are not in the set of addresses known to SDN controller 160. For example, hypervisor-A 114A may determine that IP address=IP8 belongs to the set of IP addresses in ARP table 420 when IP8 is mapped to non-zero elements based on k hash functions. In this case, according to blocks 540-545 in FIG. 5, hypervisor-A 114A generates and sends a query message to SDN controller 160.

However, since IP8 is not found in ARP table 420 maintained by SDN controller 160, a false positive is detected, which causes SDN controller 160 sends an invalid result message to hypervisor-A 114A according to block 565 in FIG. 5. The invalid result message causes the ARP request message to be broadcasted according to block 575 in FIG. 5. For a Bloom filter, the rate of false positive (f) may be calculated as follows based on n=size of ARP table 420 maintained by SDN controller 160, m=size of couting array 410 and k=number of hash functions:

$$f = \left(1 - e^{-\frac{kn}{m}}\right)^k$$

In general, there is usually a tradeoff between space efficiency for storing counting array 410 of size m, and the rate of false positives. Depending on the desired implementation, f may be optimized within an acceptable range (e.g., around 0.001-0.01) by adjusting n, m and k.

VTEP Information Query

Besides address resolution, examples of the present disclosure may be performed for other type of control information query. As will be explained using FIG. 8, hosts 110A-C may send query messages to SDN controller to obtain VTEP information (i.e., control information) associated with a MAC address (i.e., query key). Here, the "VTEP information" (referred to as "VTEP INFO" in FIG. 8) may include any suitable information associated with a VTEP, such as VTEP IP address, VTEP MAC address, a logical overlay network identifier (e.g., VNI) associated with the VTEP, etc. Similar to the examples in FIG. 6 and FIG. 7, a set membership filter may be applied before a query message is generated and sent to SDN controller 160.

Figure 8:
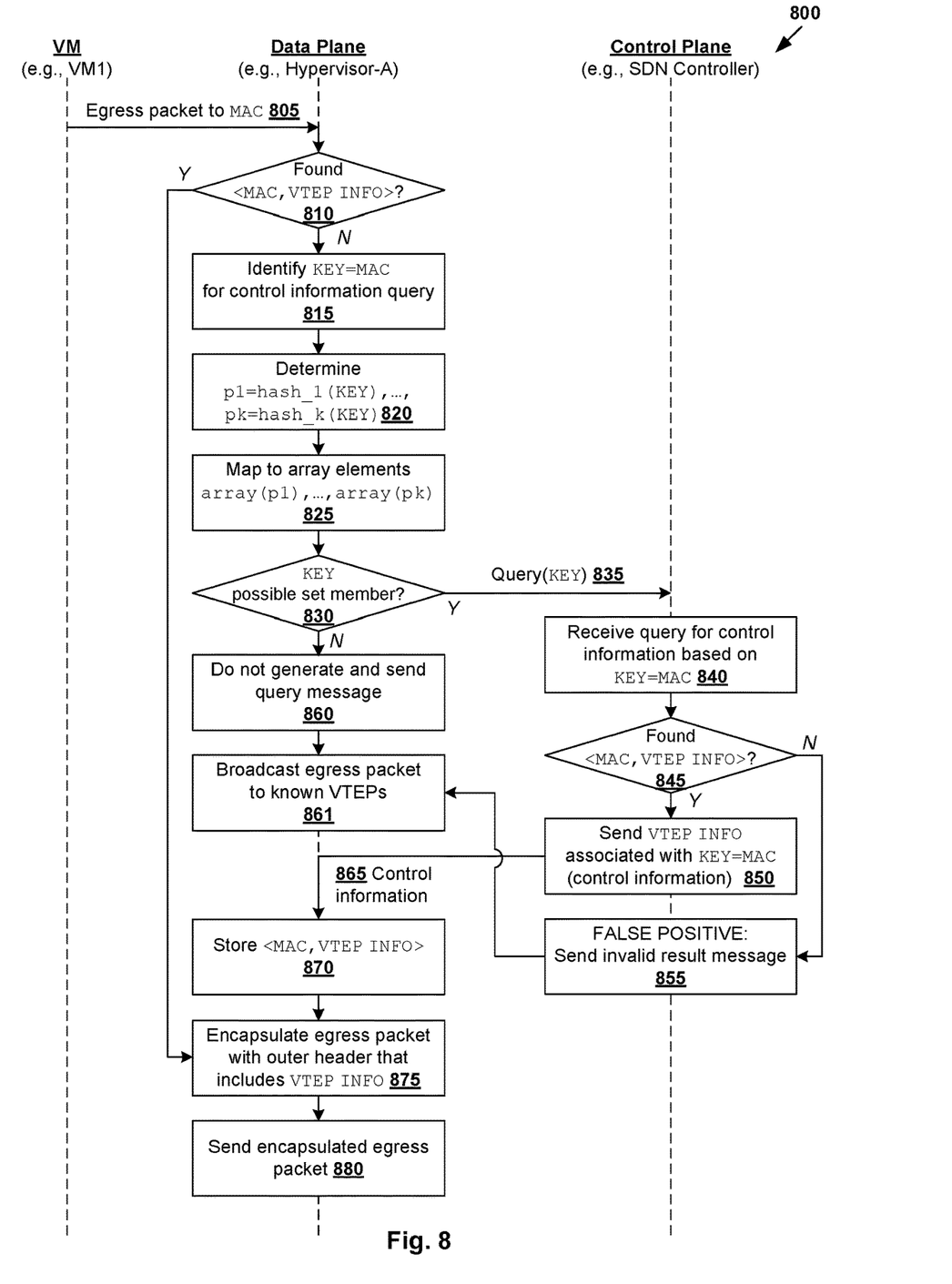
FIG. 8 is a flowchart of a second example detailed process for filter-based control information query in an SDN environment.

In more detail, FIG. 8 is a flowchart of second example detailed process 800 for filter-based control information query in SDN environment 100. Example process 800 may include one or more operations, functions, or actions illustrated at 805 to 880. The various operations, functions or actions may be combined into fewer blocks, divided into additional blocks, and/or eliminated depending on the desired implementation. Similar to the example in FIG. 3, the "data plane" in FIG. 3 may be implemented by hypervisor-A 114A (e.g., using set membership test module 119A), and the "control plane" by SDN controller 160 (e.g., central control plane module 162).

At 805 in FIG. 8, hypervisor-A 114A detects an egress packet from VM1 131. For example, the egress packet may be addressed from (source IP address=IP1, source MAC address=MAC1) associated with VM1 131 to (destination IP address=IP5, destination MAC address=MAC5) associated with VM5 135.

At 810, 815, 820, 825 and 830 in FIG. 8, in response to determination that VTEP information for sending the egress packet is not found, hypervisor-A 114A identifies query key=MAC5 and applies a set membership filter on the query key. The set membership filter may include k hash functions, and an array with m elements that are configured based on a set of MAC addresses (i.e., set of second query keys) known to SDN controller 160. Similar to the examples in FIG. 3 to FIG. 7, applying the set membership filter may involve applying the k hash functions on query key=MAC5 to determine p1=hash_1(MAC5), . . . , pk=hash_k(MAC5). This is to map the query key to array elements array(p1), . . . , array(pk) to determine whether the query key is possibly a member of the set of MAC addresses known to SDN controller 160. Several scenarios are discussed below.

(a) MAC Address is Possibly a Set Member (Known)

At 830 (yes) and 835 in FIG. 8, in response to determination that query key=MAC5 is possibly a member of the set of MAC addresses known to SDN controller 160, hypervisor-A 114A generates and sends a query message specifying query key=MAC5 to SDN controller 160. At 840, 845 and 850 in FIG. 8, SDN controller 160 generates and sends control information=VTEP information associated with query key=MAC5.

Continuing at 865 and 870 in FIG. 8, in response to receiving the VTEP information, hypervisor-A 114A stores <MAC5, VTEP information> in a MAC-to-VTEP mapping information table. Using the example in FIG. 1, VM5 135 associated with (destination IP address=IP5, destination MAC address=MAC5) is supported by host-C 110C. In this case, the received VTEP information may include (VTEP IP address=IP-C, VTEP MAC address=MAC-C) associated with VTEP-C supported by hypervisor-C 114C.

At 875 in FIG. 8, the egress packet from VM1 131 is encapsulated with an outer header based on the VTEP information. The outer header may be addressed from (IP-A, MAC-A) associated with source VTEP-A at hypervisor-A 114A to (IP-C, MAC-C) associated with destination VTEP-C at hypervisor-C 114C. At 880, the encapsulated egress packet is sent. In practice, the VTEP information received from SDN controller 160 may identify multiple destination VTEPs (e.g., multicast traffic), in which multiple encapsulated egress packets may be generated.

(b) MAC Address is Not a Set Member (Unknown)

At 830 (no) and 860 in FIG. 8, in response to determination that query key=MAC5 is not a member of the set of MAC addresses known to SDN controller 160, no query message is generated and sent to SDN controller 160. In practice, the control plane may not have the necessary <MAC5, VTEP INFO> mapping information due to various reasons. In one example, since SDN controller 160 relies on reports from hosts 110A-C, it might not have the mapping information in the event of a failure (e.g., hardware, software, network, power, etc.) associated with hosts 110A-C or control-plane channels 101-103. In another example, MAC5 may be unknown due to an attack by a malicious third party.

In this case, at 861 in FIG. 8, hypervisor-A 114A may broadcast the egress packet to known VTEPs, such as VTEP-B supported by hypervisor-B 114B and VTEP-C supported by hypervisor-C 114C. Similar to the example in FIG. 7, this may involve generating two encapsulated packets. A first encapsulated packet is generated by encapsulating the egress packet with an outer header identifying (source IP address=IP-A, destination IP address=IP-B) and VNI=VXLAN5001. A second encapsulated packet is generated by encapsulating the egress packet with an outer header identifying (source IP address=IP-A, destination IP address=IP-C) and VNI=VXLAN5001.

At the destination VTEP (e.g., at hypervisor-C 114C), in response to determination that there is a VM associated with MAC5 (i.e., destination MAC address in an inner header), the encapsulated packet will be decapsulated to remove the outer header before being forwarded to the VM (e.g., VM5 135). Otherwise (e.g., at hypervisor-B 114B), the packet will be dropped because there is no VM with a matching MAC address.

(c) False Positive

Similar to the examples in FIG. 5 to FIG. 7, a false positive may occur when query key=MAC5 is classified as a possible member of the set of MAC addresses known to SDN controller 160, but is actually not a member. In this case, at 855 in FIG. 8, SDN controller 160 sends an invalid result message to hypervisor-A 114A. In this case, block 861 may be performed to broadcast the egress packet to known VTEPs as discussed above. Again, in practice, the rate of false positive (f) may be optimized within an acceptable range by adjusting n, m and k.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 8. For example, computer system(s) capable of acting as respective hosts 110A-C and SDN controller 160 may be deployed in SDN environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a host to perform filter-based control information query in a software-defined networking (SDN) environment that includes the host and a network management entity, wherein the method comprises:
    identifying a first query key for querying control information associated with the first query key from the network management entity;
    applying a set membership filter to determine whether the first query key is possibly a member of a set of second query keys that are known to the network management entity; and
    in response to determination that the first query key is possibly a member of the set of second query keys, generating and sending a query message to the network management entity over a control-plane channel to query for the control information associated with the first query key; otherwise, not generating and sending the query message to the network management entity.

2. The method of claim 1, wherein the method further comprises:
    configuring the set membership filter based on configuration information from the network management entity, wherein the set membership filter includes k hash functions, and an array with m elements that are configured based on the set of second query keys.

3. The method of claim 2, wherein applying the set membership filter comprises:
    applying the k hash functions on the first query key to map the first query key onto k elements in the array; and
    determining whether the first query key is possibly a member of the set of second query keys based on the k elements.

4. The method of claim 1, wherein identifying the first query key comprises:
    performing snooping to detect, from a virtualized computing instance supported by the host, an address resolution request message that specifies an Internet Protocol (IP) address associated with a destination with which the virtualized computing instance wishes to communicate; and
    identifying the IP address to be the first query key for retrieving control information that includes a Media Access Control (MAC) address associated with the destination.

5. The method of claim 4, wherein the method comprises:
    receiving, from the network management entity responsive to the query message, the control information that includes the MAC address associated with the destination; and
    generating and sending an address resolution response message to the virtualized computing instance, wherein the address resolution response message identifies the IP address and the MAC address.

6. The method of claim 4, wherein the method comprises:
    determining that the first query key is not a member of the set of second query keys after applying the set membership filter, or receiving an invalid result message from the network management entity responsive to the query message, wherein the invalid result message indicates a false positive produced by the set membership filter; and
    broadcasting the address resolution request message within a logical overlay network in which the virtualized computing instance is located.

7. The method of claim 1, wherein identifying the first query key comprises:
    identifying a MAC address to be the first query key for retrieving control information that includes virtual tunnel endpoint (VTEP) information associated with a destination host, wherein the destination host supports a destination virtualized computing instance associated with the MAC address.

8. A non-transitory computer-readable storage medium that includes a set of instructions which, in response to execution by a processor of a computer system, cause the processor to perform a method of filter-based control information query in a software-defined networking (SDN) environment that includes the computer system and a network management entity, wherein the method comprises:
    identifying a first query key for querying control information associated with the first query key from the network management entity;

applying a set membership filter to determine whether the first query key is possibly a member of a set of second query keys that are known to the network management entity; and in response to determination that the first query key is possibly a member of the set of second query keys, generating and sending a query message to the network management entity over a control-plane channel to query for the control information associated with the first query key; otherwise, not generating and sending the query message to the network management entity.

9. The non-transitory computer-readable storage medium of claim 8, wherein the method further comprises:

configuring the set membership filter based on configuration information from the network management entity, wherein the set membership filter includes k hash functions, and an array with m elements that are configured based on the set of second query keys.

10. The non-transitory computer-readable storage medium of claim 9, wherein applying the set membership filter comprises:

applying the k hash functions on the first query key to map the first query key onto k elements in the array; and determining whether the first query key is possibly a member of the set of second query keys based on the k elements.

11. The non-transitory computer-readable storage medium of claim 8, wherein identifying the first query key comprises:

performing snooping to detect, from a virtualized computing instance, an address resolution request message that specifies an Internet Protocol (IP) address associated with a destination with which the virtualized computing instance wishes to communicate; and identifying the IP address to be the first query key for retrieving control information that includes a Media Access Control (MAC) address associated with the destination.

12. The non-transitory computer-readable storage medium of claim 11, wherein the method comprises:

receiving, from the network management entity responsive to the query message, the control information that includes the MAC address associated with the destination; and generating and sending an address resolution response message to the virtualized computing instance, wherein the address resolution response message identifies the IP address and the MAC address.

13. The non-transitory computer-readable storage medium of claim 11, wherein the method comprises:

determining that the first query key is not a member of the set of second query keys after applying the set membership filter, or receiving an invalid result message from the network management entity responsive to the query message, wherein the invalid result message indicates a false positive produced by the set membership filter; and broadcasting the address resolution request message within a logical overlay network in which the virtualized computing instance is located.

14. The non-transitory computer-readable storage medium of claim 8, wherein identifying the first query key comprises:

identifying a MAC address to be the first query key for retrieving control information that includes virtual tunnel endpoint (VTEP) information associated with a destination host, wherein the destination host supports a destination virtualized computing instance associated with the MAC address.

15. A host configured to perform filter-based control information query in a software-defined networking (SDN) environment that includes the host and a network management entity, wherein the host comprises:

a processor; and a non-transitory computer-readable medium having stored thereon instructions that, when executed by the processor, cause the processor to:

identify a first query key for querying control information associated with the first query key from the network management entity;

apply a set membership filter to determine whether the first query key is possibly a member of a set of second query keys that are known to the network management entity; and in response to determination that the first query key is possibly a member of the set of second query keys, generate and send a query message to the network management entity over a control-plane channel to query for the control information associated with the first query key; otherwise, not generate and send the query message to the network management entity.

16. The host of claim 15, wherein the instructions further cause the processor to:

configure the set membership filter based on configuration information from the network management entity, wherein the set membership filter includes k hash functions, and an array with m elements that are configured based on the set of second query keys.

17. The host of claim 16, wherein instructions for applying the set membership filter cause the processor to:

apply the k hash functions on the first query key to map the first query key onto k elements in the array; and determine whether the first query key is possibly a member of the set of second query keys based on the k elements.

18. The host of claim 15, wherein instructions for identifying the first query key cause the processor to:

perform snooping to detect, from a virtualized computing instance supported by the host, an address resolution request message that specifies an Internet Protocol (IP) address associated with a destination with which the virtualized computing instance wishes to communicate; and identify the IP address to be the first query key for retrieving control information that includes a Media Access Control (MAC) address associated with the destination.

19. The host of claim 18, wherein the instructions further cause the processor to:

receive, from the network management entity responsive to the query message, the control information that includes the MAC address associated with the destination; and generate and sending an address resolution response message to the virtualized computing instance, wherein the address resolution response message identifies the IP address and the MAC address.

20. The host of claim 18, wherein the instructions further cause the processor to:

determine that the first query key is not a member of the set of second query keys after applying the set membership filter, or receiving an invalid result message from the network management entity responsive to the query message, wherein the invalid result message indicates a false positive produced by the set membership filter; and broadcast the address resolution request message within a logical overlay network in which the virtualized computing instance is located.

21. The host of claim 15, wherein instructions for identifying the first query key cause the processor to:

identify a MAC address to be the first query key for retrieving control information that includes virtual tunnel endpoint (VTEP) information associated with a destination host, wherein the destination host supports a destination virtualized computing instance associated with the MAC address.

* * * * *